US012455571B1

(12) United States Patent
Gayaka et al.

(10) Patent No.: US 12,455,571 B1
(45) Date of Patent: Oct. 28, 2025

(54) SYSTEM TO DETERMINE COLLISIONS OF AN AUTONOMOUS MOBILE DEVICE

(71) Applicant: AMAZON TECHNOLOGIES, INC., Seattle, WA (US)

(72) Inventors: Shreekant Gayaka, Fremont, CA (US); Shengchen Liu, Santa Clara, CA (US); Boshen Niu, San Mateo, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 361 days.

(21) Appl. No.: 18/060,334

(22) Filed: Nov. 30, 2022

(51) Int. Cl.
*G05D 1/00* (2024.01)
*G01C 21/16* (2006.01)

(52) U.S. Cl.
CPC .......... *G05D 1/027* (2013.01); *G01C 21/165* (2013.01); *A47L 2201/04* (2013.01)

(58) Field of Classification Search
CPC .... G05D 1/027; A47L 2201/04; G01C 21/165
See application file for complete search history.

(56) References Cited

U.S. PATENT DOCUMENTS

| | | | |
|---|---|---|---|
| 2020/0206919 A1* | 7/2020 | Nakayama | B25J 9/1674 |
| 2020/0253445 A1* | 8/2020 | So | A47L 9/0411 |
| 2022/0035375 A1* | 2/2022 | Rezaee | G06N 3/08 |
| 2023/0242133 A1* | 8/2023 | Herman | G01S 7/4972 |
| | | | 701/33.1 |
| 2023/0242142 A1* | 8/2023 | Zhang | B60W 60/001 |
| | | | 701/23 |

\* cited by examiner

*Primary Examiner* — Russell Frejd
(74) *Attorney, Agent, or Firm* — Lindauer Law, PLLC

(57) ABSTRACT

An autonomous mobile device (AMD) moves within in a physical space. The AMD may encounter features in the physical space, such as flooring transitions, or obstacles that may impede movement. Sensors such as an inertial measurement unit (IMU), wheel encoders, and motor torque sensors acquire sensor data. Based on the sensor data, measured motion values are determined. Based on physical parameters of the AMD and the sensor data, predicted motion values are determined. A residual or difference between the predicted and measured motion values is calculated. If the residual exceeds a threshold range, a collision may be deemed to have occurred. Characteristics of the residual may be used to determine which side of the AMD collided with an obstacle. Collisions are reliably detected while false detections due to features such as uneven floors or flooring transitions are reduced or eliminated.

20 Claims, 10 Drawing Sheets

SYSTEM TO DETERMINE COLLISIONS OF AN AUTONOMOUS MOBILE DEVICE

BACKGROUND

An autonomous mobile device (AMD) moves throughout a physical space that may include obstacles, uneven floors, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
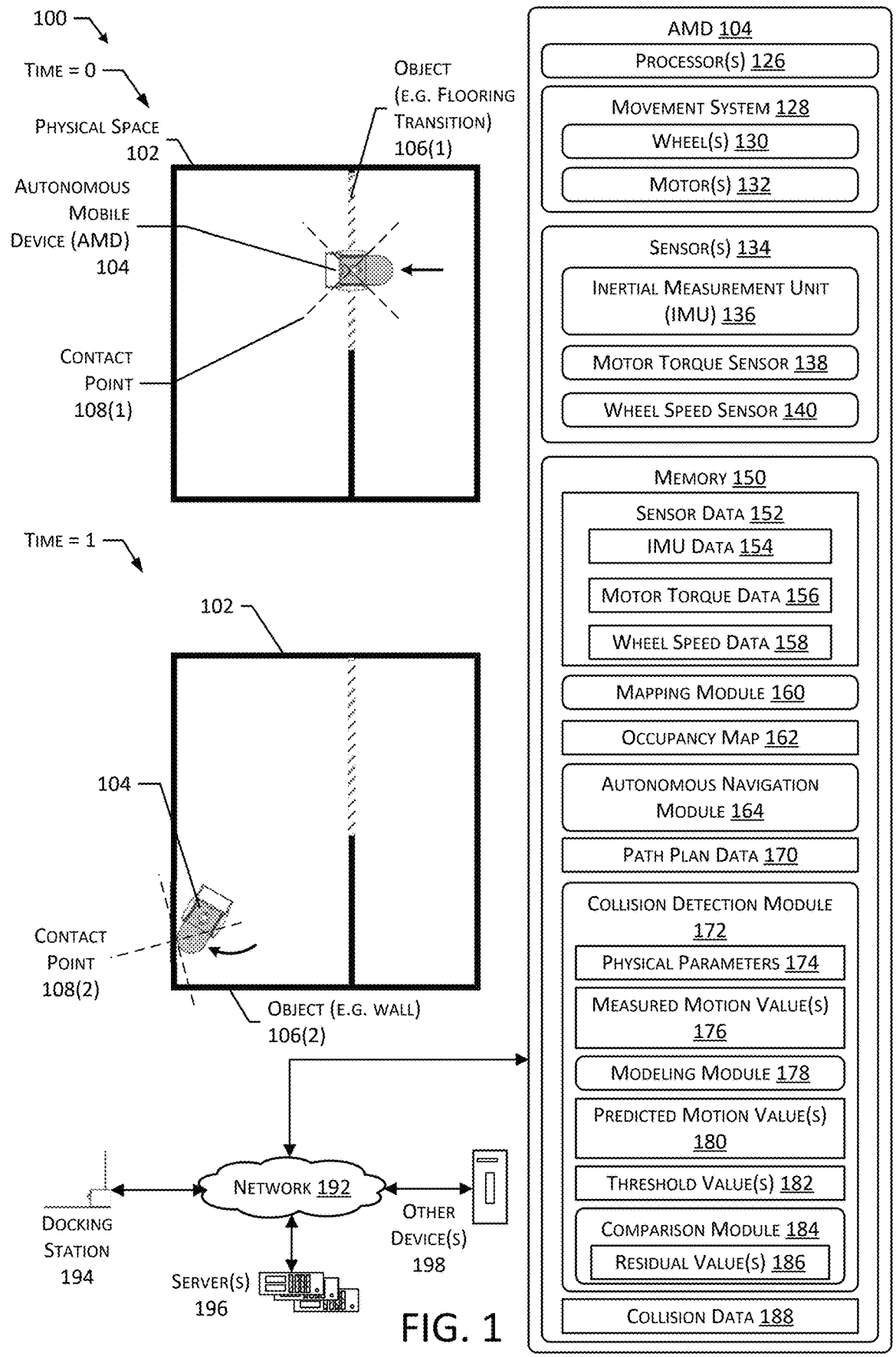
FIG. 1 illustrates an autonomous mobile device (AMD) with a collision detection module, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement that allows the AMD to move between locations in a physical space without being driven or controlled by a user. A movement system may include one or more motors driving one or more of wheels or legs to enable the movement of the AMD. In implementations in which the AMD utilizes wheels or legs, the wheels or legs are supported by a floor or other surface. The floor may be relatively flat or may have features such as elevation changes or transitions, uneven flooring surfaces, and so forth.

While moving through the physical space the AMD moves across the floor. During this movement, the AMD may collide with obstacles. For example, while the AMD is moving someone may throw a ball at the AMD, causing a collision between the ball and the AMD. In another example, while the AMD is moving it may inadvertently come into contact with an obstacle such as furniture, a wall, and so forth. In still another example, while moving across the floor the AMD may experience bumps due to elevation changes of the floor.

Sensors such as bumper switches and similar mechanisms may be used to detect a collision. However, this requires the AMD being designed to have such switches installed, increasing the part count of the AMD and the overall cost. Even if bumper switches were added to the AMD, it may be infeasible to equip every surface of the AMD to detect collisions from different directions. In such a configuration, collisions may not be detected.

Sensors that detect inertial movements, such as inertial measurement units (IMUs) that may include accelerometers, gyrometers, and so forth, may be used to detect collisions. For example, if the IMU detects an acceleration that exceeds a threshold value, a collision may be deemed to have taken place. However, the comparison of only data from an IMU to a threshold may result in false positive collisions. For example, as the AMD encounters and moves past a transition or other elevation change in a floor, it may experience a bump or set of transitory accelerations. Continuing the example, the bump comprises a rapid vertical acceleration as the AMD is displaced upwards, and may also include accelerations with respect to other axes. This acceleration may exceed a threshold value previously associated with a collision. In such a situation, this would result in the AMD incorrectly determining a collision has taken place. Responsive to the detection of the false collision, the AMD may stop. This is an undesirable behavior and may result in the AMD failing to perform a task, may result in a poor user experience, and so forth.

Described in this disclosure are techniques and systems for determining collision data and operating an AMD based on the collision data. The collision data may indicate the occurrence of a collision as well as a location, relative to the AMD, of the collision. For example, the collision data may indicate that the AMD has experienced a collision on a rear or aft portion.

One or more sensors of the AMD provide sensor data to a collision detection module. The sensor data may include IMU data acquired by an IMU. For example, the IMU data may include information about linear acceleration, angular acceleration, linear velocity, angular velocity, and so forth with respect to one or more axes of the IMU that is affixed to the AMD. The sensor data may include motor torque data indicative of torque being applied to one or more motors used to move the AMD. The sensor data may also include a wheel speed sensor, indicative of rotation of a wheel associated with locomotion of the AMD.

The sensor data is processed to determine measured motion values. For example, the measured motion values may indicate, with respect to three mutually orthogonal axes of a body of the AMD, linear accelerations, linear velocities, angular accelerations, angular velocities, and so forth.

Predicted motion values are also determined based on the sensor data and one or more physical parameters using a physics-based model. The physical parameters describe the AMD such as its total mass or weight, location relative to the axes of the center of mass, radii of the wheels, distance between the wheels, moment of inertia of the AMD, and so forth. The predicted motion values are representative of how, given the input values, the AMD would be expected to move. For example, given the physical parameters and sensor data such as the measured motor torque and wheel speeds, a predicted velocity may be calculated.

Residual values are calculated based on the measured motion values and the predicted motion values. For example, the residual values may comprise the difference between the measured and predicted motion values with respect to a particular axis of the AMD. The residual values may be indicative of one or more of a linear residual or an angular residual. For example, a first linear residual may be indicative of a variance between the measured linear motion and predicted linear motion with respect to a first axis. In another example, a first angular residual may be indicative of a variance between the measured angular motion and predicted angular motion with respect to a second axis.

The residual values may then be compared to threshold values to determine whether a collision has occurred. For example, if the residual values exceed a collision threshold value, a collision may be deemed to have occurred. Different threshold values may be specified for linear residuals and angular residuals. Different threshold values may also be specified for particular axes. Based on the axis associated with the residual and a sign indicative of whether the residual is positive or negative, the collision may be specified with respect to the AMD. For example, based on the residual values a collision may be deemed to occur at a front of the AMD, at a back of the AMD, and so forth.

In some implementations the threshold values used to determine whether a collision has occurred may be based at least in part on one more other factors. For example, the threshold values may be based on the speed of the AMD, such that as the speed increases the threshold values change. In another example, the threshold values may be based on the total mass or weight of the AMD including a load being carried by the AMD.

By using these techniques and systems the AMD is able to quickly and accurately determine a collision. Actual collisions are quickly detected, improving operational safety of the AMD. False collision detections are substantially reduced or eliminated, preventing unnecessary interruption of operation. As a result, the AMD is able to more safely and effectively move throughout the physical space.

Illustrative System

FIG. 1 illustrates at 100, a physical space 102 that includes an autonomous mobile device (AMD) 104. The physical space 102 may include one or more objects 106. These objects 106 may include flooring transitions 106(1), walls 106(2), uneven floors (not shown), and so forth.

An object 106 may prevent traversal by the AMD 104. For example, an object 106 may comprise a wall 106(2), stairwell, and so forth. Some objects 106 may not prevent traversal. For example, the AMD 104 that rolls on wheels or walks on legs is supported by a floor. The floor may include a flooring transition 106(1) comprising a piece of material that is placed between two dissimilar pieces of flooring material, to join separate sections of the same or different flooring materials, and so forth. For example, a wooden "T" molding may be used to conceal a gap between two sections of wood flooring. Once installed, the piece of molding may have an uppermost portion that is higher than the surrounding flooring. In another example, the flooring transition 106(1) may omit the different material. For example, a concrete floor may directly abut a wood floor. Regardless of whether the flooring materials are the same or different, elevation changes may also be present in the flooring of the physical space 102. These elevation changes may be relatively minor and limited to a particular area, such as a 1 cm height difference in flooring between rooms. A flooring transition 106(1) comprising a small ramp or quarter round molding may be used to accommodate this heigh difference. In other circumstances, such as with uneven flooring surfaces such as cobblestones or uncut stone, elevation changes may be present over a larger area.

The AMD 104 includes one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The AMD 104 includes a movement system 128. The movement system 128 may comprise one or more wheels 130 driven by one or more motors 132 or other actuators to enable the AMD 104 to move from one location in the physical space 102 to another. For example, a motor 132 may be used to drive a wheel 130 attached to a chassis of the AMD 104, which causes the AMD 104 to move. In some implementations, the AMD 104 may include non-driven wheels, such as casters. The AMD 104 may turn, move forward, move backward, and so forth. In another example, actuators may move legs allowing the AMD 104 to walk.

The AMD 104 is supported by an object 106 such as the floor. The points at which the AMD 104 comes into contact with an object 106 are contact points 108. During normal operation of a wheeled AMD 104, the contact points 108 are the bottom of the wheels 130. For example, at time=0 the AMD 104 is shown moving over a flooring transition object 106(1). The wheels 130 come into contact with the flooring transition object 106(1), and are the contact points 108(1), one for each wheel 130 used. Depending on various factors, such as elevation changes in the flooring, speed, size of the wheels 130, and so forth, the AMD 104 may experience a bump as it traverses over an object 106 that presents an elevation change.

The AMD 104 may come into contact with other objects 106. For example, the AMD 104 may be struck by a moving object 106 such as a moving toy, may inadvertently collide with the wall 106(2) as shown at time=1, or furniture, and so forth. As shown at time=1, the point of contact 108(2) is on a left rear portion of the AMD 104. A collision detection module 172 (described below) may be used to determine if a collision has occurred.

The AMD 104 includes one or more sensors 134. The sensors 134 may comprise an inertial measurement unit (IMU) 136, a motor torque sensor 138, wheel speed sensor 140, or other sensors. The IMU 136 may comprise one or more accelerometers and gyrometers, and so forth. The motor torque sensor 138 may comprise circuitry to determine a shaft torque of one or more of the motors 132 of the movement system 128. The wheel speed sensor 140 may comprise an optical encoder, Hall effect sensor, or other device to determine an angular rate or rotation of a wheel such as the wheels 130, casters, and so forth. The sensors 134 as discussed in more detail with regard to FIG. 3.

The AMD 104 includes one or more memories 150. These may store sensor data 152 acquired by one or more of the sensors 134, such as IMU data 154, motor torque data 156, and wheel speed data 158. For example, the IMU 136 may provide as output IMU data 154 indicative of accelerations and rotations. In another example, the motor torque sensor 138 may provide motor torque data 156 indicative of motor torque at particular times. In another example, the wheel speed sensor 140 may provide wheel speed data 158 indicative of an angular velocity at particular times.

A mapping module 160 may use sensor data 152 to determine an occupancy map 162. The occupancy map 162 is indicative of one or more obstacles and their locations in the physical space 102. For example, the occupancy map 162 may indicate the presence of objects 106 such as walls, furniture, flooring transitions, and so forth. In some implementations the occupancy map 162 may include information determined by the collision detection module 172. For example, the occupancy map 162 may include information indicating a portion of the physical space 102 that includes uneven flooring.

An autonomous navigation module 164 provides the AMD 104 with the ability to navigate within the physical space 102 without real-time human interaction. The autonomous navigation module 164 may implement, or operate in conjunction with, the mapping module 160 to determine the occupancy map 162. For example, the autonomous navigation module 164 and the mapping module 160 may perform an exploration of the physical space 102 to acquire sensor data 152 about the physical space 102 that is then used to determine the occupancy map 162. The autonomous navigation module 164 may generate path plan data 170 that is indicative of a path through the physical space 102 from the current location of the AMD 104 to a destination location based on the occupancy map 162. The AMD 104 may then begin moving along the path. The autonomous navigation module 164 is discussed in more detail with regard to FIG. 2.

The memory 150 may also store a collision detection module 172. The collision detection module 172 may store or otherwise access physical parameters 174 associated with the AMD 104. The physical parameters 174 are representative of the AMD 104. They may be determined for the specific AMD 104, such as measured once manufacture is finished, or may be determined for a specified model or version of the AMD 104 and subsequently used for later produced units. The physical parameters 174 may comprise one or more of mass (or weight) of the AMD, location of a center of mass (or center of mass) of the AMD, radius of the wheel(s) 130, distance between a centerline of the AMD 104 and the wheel(s) 130, moment of inertia of the wheel(s) 130, moment of inertia of a body of the AMD 104, and so forth.

The collision detection module 172 may accept as input at least a portion of the sensor data 152. Measured motion values 176 may be determined that are indicative of movement of the AMD 104. For example, the measured motion values 176 may indicate linear velocity, angular velocity, or other information at particular times. For example, the measured motion values 176 may be determined based on the IMU data 154 that is indicative of, or based on, the accelerations detected by the IMU 136, wheel speed data 158 from the wheel speed sensors 140, and so forth. In some implementations the measured motion values 176 may be provided by other modules.

A modeling module 178 accepts as input the physical parameters 174 and at least a portion of the sensor data 152 to determine predicted motion values 180. The modeling module 178 may utilize a physics-based model of the AMD 104, as parameterized by the physical parameters 174, to determine the predicted motion values 180. For example, given the motor torque data 156 for each of the driven wheels 130, the modeling module 178 may determine predicted motion values 180 such as a linear velocity indicative of a linear direction and linear speed, an angular velocity indicative of a rotational direction and angular speed, and so forth. Operation of the modeling module 178 is discussed in more detail with respect to FIG. 4.

In some implementations the modeling module 178 may also accept input from other systems. For example, the modeling module 178 may accept input from the autonomous navigation module 164 or other modules that is indicative of instructions to drive the one or more motors 132.

A comparison module 184 accepts as input the measured motion values 176 and the predicted motion values 180 and determines residual values 186. For example, the measured motion value 176 of measured linear velocity with respect to an X axis may be subtracted from a predicted motion value 180 of measured linear velocity with respect to the X axis. The residual values 186 are indicative of a variance between the measured and predicted values. The residual values 186 may then be compared to corresponding threshold values 182. If one or more residual values 186 exceed a corresponding threshold value 182, collision data 188 indicative of a collision may be generated. If the residual values 186 do not exceed the corresponding threshold values 182, the collision data 188 may indicate no collision has occurred.

The residual values 186 may also be used to approximate the contact point 108 of the collision. For example, the contact point 108 may be determined based on the mathematical sign that indicates if a particular residual value 186 is positive or negative and given information about a coordinate system, such as which direction is +X, which direction is −X, and so forth.

The collision detection module 172 may provide other output. In one implementation, the output may comprise an estimation of mass or weight of the AMD 104 based on the sensor data 152. Other output may include data indicative of floor conditions. For example, a coefficient of friction between the AMD 104 and the floor may be calculated. In another example, a determination may be made as to whether the floor is uneven.

The collision data 188 or other data may then be used to operate the AMD 104. For example, if the collision data 188 indicates a collision has occurred, the AMD 104 may stop moving. Continuing the example, based on the collision data 188 indicating an approximate contact point 108, the AMD 104 may proceed to take mitigating action. For example, if the approximate contact point 108 occurred on the left rear of the AMD 104 such as shown at time=2, the AMD 104 may move forward by a specified minimum distance, such as one half of an overall length of the AMD 104, and to the right to move away from the object 106.

In some implementations the collision detection module 172 may be scheduled to generate collision data 188 and publish or send the collision data 188 to other modules. In other implementations, the collision detection module 172 may generate collision data 188 only when a collision is deemed to have occurred.

In some implementations the threshold values 182 may vary. For example, the threshold values 182 may vary based on the measured linear velocity with respect to the X axis such that as the speed of the AMD 104 increases, the threshold value(s) 182 changes. In another example, the threshold values 182 may vary based on the mass or weight of the AMD 104.

The AMD 104 may use network interfaces to connect to a network 192. For example, the network 192 may comprise a wireless local area network, that in turn is connected to a wide area network such as the Internet.

The AMD 104 may be configured to dock or connect to a docking station 194. The docking station 194 may provide external power which the AMD 104 may use to charge a battery of the AMD 104.

The docking station 194 may also be connected to the network 192. For example, the docking station 194 may be configured to connect to the wireless local area network 192 such that the docking station 194 and the AMD 104 may communicate.

The AMD 104 may access one or more servers 196 via the network 192. For example, the AMD 104 may utilize a wakeword detection module to determine if a user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 196 for further processing. The servers 196 may process the spoken audio and return to the AMD 104 data that may be subsequently used to operate the AMD 104.

The AMD 104 may also communicate with other devices 198. The other devices 198 may include one or more devices that are within the physical space 102 such as a home or associated with operation of one or more devices in the physical space 102. For example, the other devices 198 may include a doorbell camera, a garage door opener, a refrigerator, washing machine, and so forth. In some implementations, the other devices 198 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
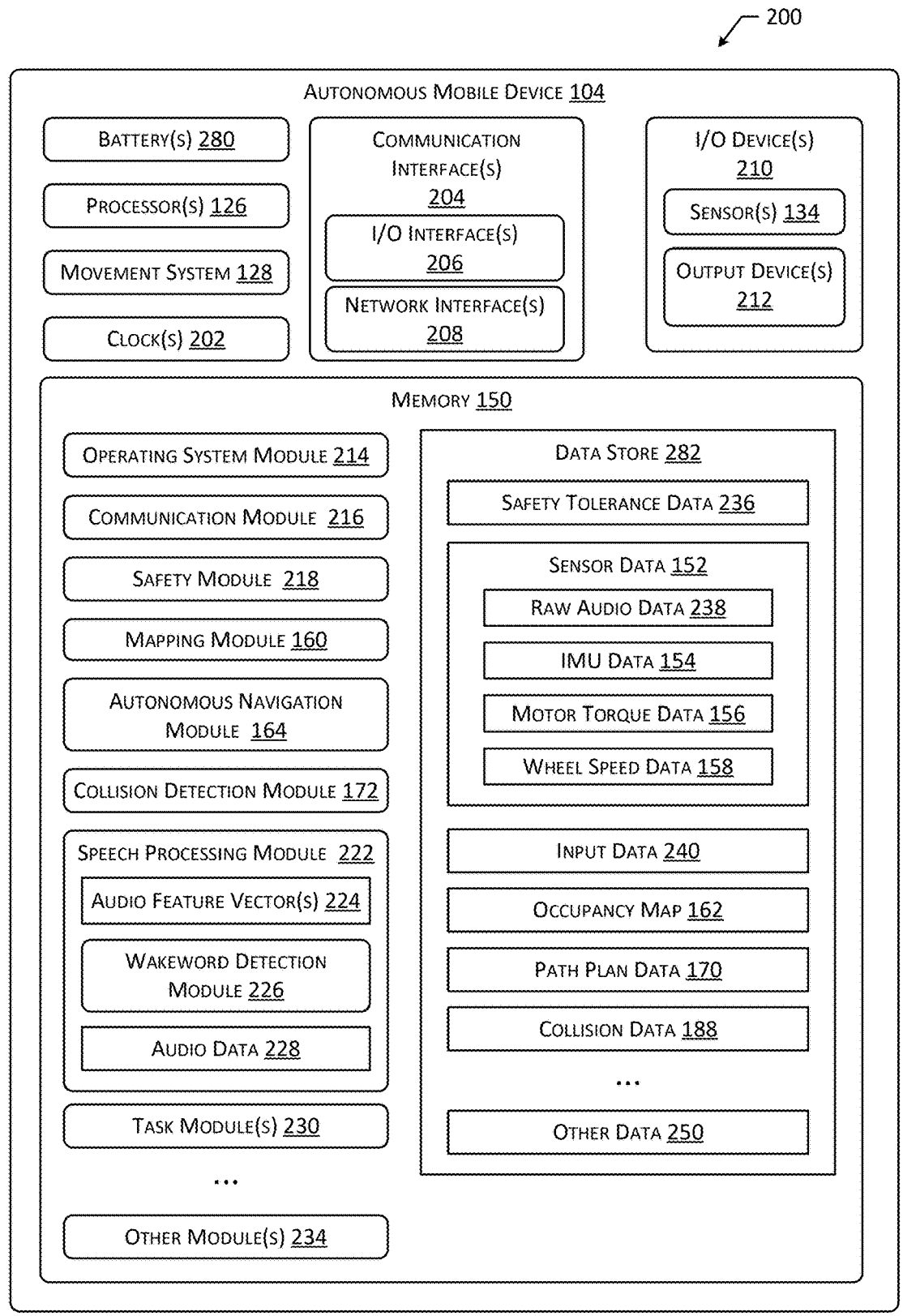
FIG. 2 is a block diagram of the AMD, according to some implementations.

FIG. 2 is a block diagram 200 of the AMD 104, according to some implementations.

The AMD 104 may include one or more batteries 280 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The movement system 128 of the AMD 104 may include one or more wheels 130 that are driven by one or more motors 132 or other actuators to enable the AMD 104 to move from one location in the physical space 102 to another.

One or more clocks 202 may provide information indicative of date, time, ticks, and so forth. For example, the processor 126 may use data from the clock 202 to associate a particular time with an action, sensor data 152, and so forth.

The AMD 104 may include one or more communication interfaces 204 such as input/output (1/O) interfaces 206, network interfaces 208, and so forth. The communication interfaces 204 enable the AMD 104, or components thereof, to communicate with other devices 198 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 134, keyboard, mouse, scanner, and so forth. The I/O devices 210 may also include output devices 212 such as one or more of a motor 132, light, speaker, display, projector, printer, and so forth. In some embodiments, the I/O devices 210 may be physically incorporated with the AMD 104 or may be externally placed.

The network interfaces 208 may be configured to provide communications between the AMD 104 and other devices 198 such as other AMDs 104, docking stations 194, routers, access points, and so forth. The network interfaces 208 may include devices configured to couple to personal area networks (PANs), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 150. The memory 150 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the AMD 104. A few example functional modules are shown stored in the memory 150, although the same functionality may alternatively be implemented in hardware, firmware, or as a system on a chip (SoC).

The memory 150 may include at least one operating system (OS) module 214. The OS module 214 is configured to manage hardware resource devices such as the I/O interfaces 206, the I/O devices 210, the communication interfaces 204, and provide various services to applications or modules executing on the processors 126. The OS module 214 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; or the Robot Operating System (ROS).

Also stored in the memory 150 may be a data store 282 and one or more of the following modules. These modules may be executed as foreground applications, background tasks, daemons, and so forth. The data store 282 may use a flat file, database, linked list, tree, executable code, script, or other data structure to store information. In some implementations, the data store 282 or a portion of the data store 282 may be distributed across one or more other devices 198 including other AMDs 104, servers 196, network attached storage devices, and so forth.

A communication module 216 may be configured to establish communication with other devices 198, such as other AMDs 104, an external server 196, a docking station 194, and so forth. The communications may be authenticated, encrypted, and so forth.

Other modules within the memory 150 may include a safety module 218, the mapping module 160, the autonomous navigation module 164, a speech processing module 222, one or more task modules 230, or other modules 234. The modules may access data stored within the data store 282, including safety tolerance data 236, sensor data 152 including the IMU data 154, motor torque data 156, wheel speed data 158, and so forth, the occupancy map 162, other data 250, and so forth.

The safety module 218 may access the safety tolerance data 236 to determine within what tolerances the AMD 104 may operate safely within the physical space 102. The safety module 218 may include, or operate in conjunction with, a collision avoidance system. For example, the safety module 218 may be configured to stop the AMD 104 from moving when an obstacle is determined to be present along the AMD's 104 path of travel. Movement of the AMD 104 may be stopped by one or more of inhibiting operations of one or more of the motors 132, issuing a command to stop motor operation, disconnecting power from one or more of the motors 132, and so forth. The safety module 218 may be implemented as hardware, software, or a combination thereof.

The safety module 218 may control other factors, such as a maximum speed of the AMD 104 based on information obtained by the sensors 134, precision and accuracy of the sensor data 152, and so forth. For example, a maximum speed permitted by the safety module 218 may be based on one or more factors such as the weight of the AMD 104, nature of the floor, distance to a nearest obstacle, and so forth.

As the AMD 104 moves through the physical space 102, the mapping module 160 may use sensor data 152 to determine the occupancy map 162 of the physical space 102. For example, image data from one or more cameras may be processed to determine the presence of objects 106, approximate locations in the physical space 102, category of object 106, and so forth. The occupancy map 162 may represent dimensions of the physical space 102 and obstacles within the physical space 102. The occupancy map 162 may also include information about the object 106, such as size, position, and orientation.

In some implementations, the occupancy map 162 may comprise a plurality of cells with each cell of the plurality of cells representing a particular area in the physical space 102. The occupancy map 162 may indicate whether an area of the physical space 102 associated with a given cell includes an object 106 or other obstacle.

The autonomous navigation module 164 provides the AMD 104 with the ability to navigate within the physical space 102 without real-time human interaction. The autonomous navigation module 164 may implement, or operate in conjunction with, the mapping module 160 to determine the occupancy map 162 or other representation of the physical space 102. In one implementation, the mapping module 160 may use one or more simultaneous localization and mapping ("SLAM") techniques. The SLAM algorithms may utilize one or more of maps, algorithms, beacons, or other techniques to navigate. The autonomous navigation module 164 may use the occupancy map 162 to determine a set of possible paths along which the AMD 104 may move. One of these may be selected and used to determine path plan data 170 indicative of a path. For example, a possible path that is the shortest or has the fewest turns may be selected and used to determine the path. The path is then subsequently used to determine a set of commands that drive the motors 132 connected to the wheels 130.

The autonomous navigation module 164 may utilize various techniques during processing of sensor data 152. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 126, in response to a command received from one or more communication interfaces 204, as determined from the sensor data 152, and so forth. For example, an external server 196 may send a command that is received using the network interface 208. This command may direct the AMD 104 to proceed to find a particular user, follow a particular user, and so forth. The AMD 104 may then process this command and use the autonomous navigation module 164 to determine the directions and distances associated with carrying out the command. For example, the command to "come here" may result in the task module 230 sending a command to the autonomous navigation module 164 to move the AMD 104 to a particular location near the user and orient the AMD 104 in a particular direction.

The collision detection module 172 determines collision data 188. The collision data 188 may be indicative of a collision occurring, an approximate contact point 108, and so forth.

The speech processing module 222 may be used to process utterances of the user. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 192 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 196 for speech processing. The audio data 228 corresponding to audio obtained by the microphone may be processed locally on one or more of the processors 126, sent to a server 196 for routing to a recipient device or may be sent to the server 196 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by another module of the AMD 104, prior to sending to the server 196, and so forth.

The speech processing module 222 may include or access an automated speech recognition (ASR) module. The ASR module may accept as input raw audio data 238, audio feature vectors 224, or other sensor data 152 and so forth and may produce as output the input data 240 comprising a text string or other data representation. The input data 240 comprising the text string or other data representation may be processed by one or more modules of the AMD 104 to determine the command to be executed. For example, the utterance of the command "robot, come here" may result in input data 240 comprising the text string "come here". The wakeword "robot" may be omitted from the input data 240.

The AMD 104 may connect to the network 192 using one or more of the network interfaces 208. In some implementations, one or more of the modules or other functions described here may execute on the processors 126 of the AMD 104, on the server 196, or a combination thereof. For example, one or more servers 196 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a user is able to understand.

The data store 282 may store the other data 250 as well. For example, localization settings may indicate local preferences such as language, user identifier data may be stored that allows for identification of a particular user, and so forth.

Modules described herein, such as the mapping module 160, may provide various processing functions such as de-noising, filtering, and so forth. Processing of sensor data 152, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 152. In still another implementation, functions such as those in the Machine Vision Toolbox (MVTB) available using MAT-LAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 152 or other data. For example, the ANN may be trained using a supervised learning algorithm such that object identifiers are associated with images of particular objects within training images provided to the ANN. Once trained, the ANN may be provided with the sensor data 152 and produce output indicative of the object identifier.

Figure 3:
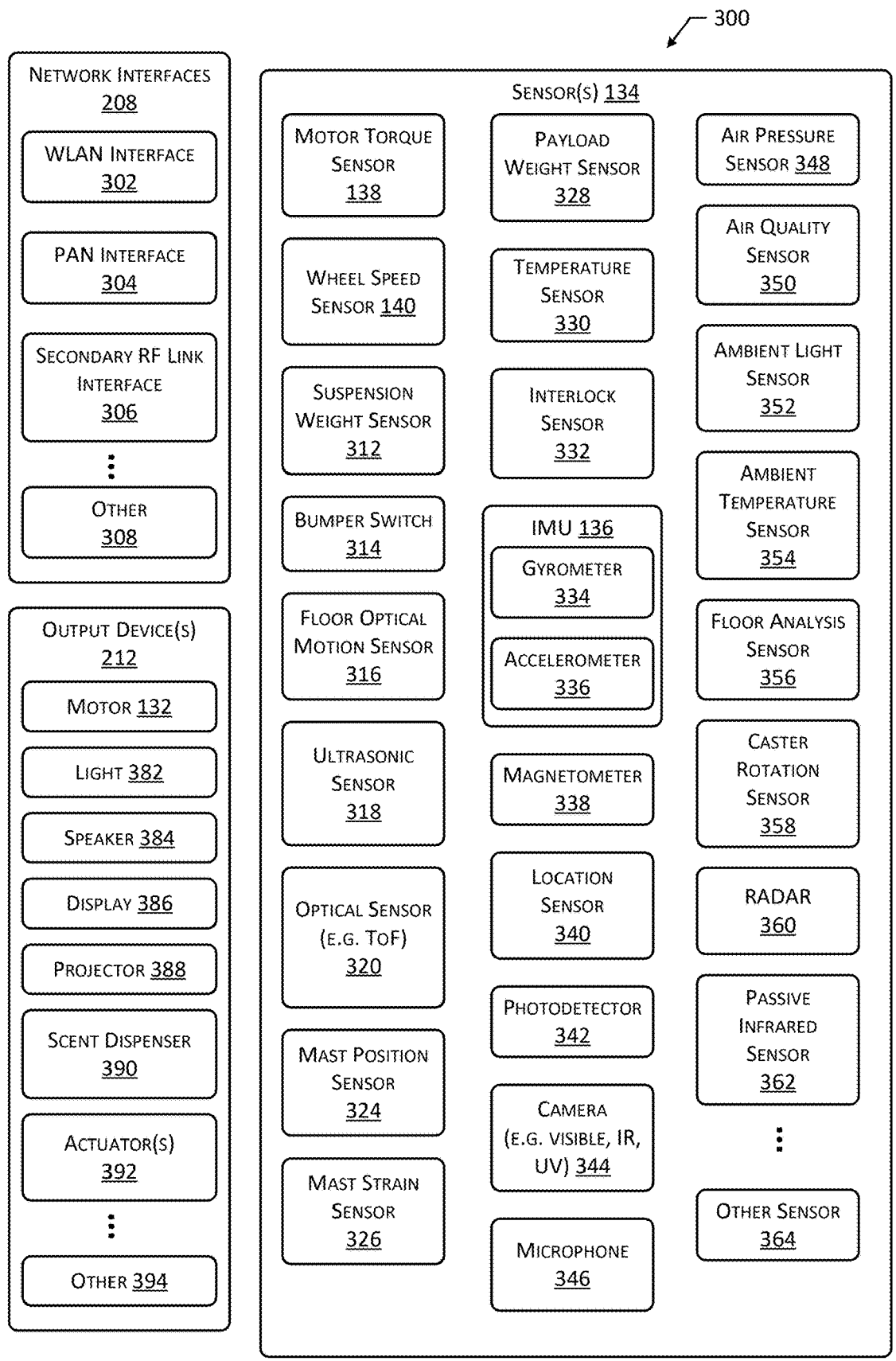
FIG. 3 is a block diagram of some components of the AMD, according to some implementations.

FIG. 3 is a block diagram 300 of some components of the AMD 104 such as network interfaces 208, sensors 134, and output devices 212, according to some implementations. The components illustrated here are provided by way of illustration and not necessarily as a limitation. For example, the AMD 104 may utilize a subset of the particular network interfaces 208, output devices 212, or sensors 134 depicted here, or may utilize components not pictured. One or more of the sensors 134, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 198 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 194, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the LTE, 5G, 6G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

The motor torque sensor 138 may comprise circuitry to determine a shaft torque of one or more of the motors 132 of the movement system 128. In some implementations, the motor torque sensor 138 may be determined based on back electromotive force, output from a strain gauge, input amperage, rotational speed as provided by a wheel speed sensor 140, or other techniques.

A wheel speed sensor 140 provides information indicative of the rotation or linear extension of a motor 132. The motor 132 may comprise a rotary motor, or a linear actuator. In some implementations, the wheel speed sensor 140 may comprise a separate assembly such as a photodiode and encoder wheel that is affixed to the motor 132. In other implementations, the wheel speed sensor 140 may comprise circuitry configured to drive the motor 132. For example, the autonomous navigation module 164 may utilize the data from the wheel speed sensor 140 to estimate a distance traveled.

A suspension weight sensor 312 provides information indicative of the weight of the AMD 104 on the suspension system for one or more of the wheels 130 or the caster. For example, the suspension weight sensor 312 may comprise a switch, strain gauge, load cell, photodetector 342, or other sensing element that is used to determine whether weight is applied to a particular wheel 130, or whether weight has been removed from the wheel 130. In some implementations, the suspension weight sensor 312 may provide binary data such as a "1" value indicating that there is a weight applied to the wheel 130, while a "0" value indicates that there is no weight applied to the wheel 130. In other implementations, the suspension weight sensor 312 may provide an indication such as so many kilograms of force or newtons of force. The suspension weight sensor 312 may be affixed to one or more of the wheels 130 or the caster. In some situations, the safety module 218 may use data from the suspension weight sensor 312 to determine whether or not to inhibit operation of one or more of the motors 132. For example, if the suspension weight sensor 312 indicates no weight on the suspension, the implication is that the AMD 104 is no longer resting on its wheels 130, and thus operation of the motors 132 may be inhibited. In another example, if the suspension weight sensor 312 indicates weight that exceeds a threshold value 182, the implication is that something heavy is resting on the AMD 104 and thus operation of the motors 132 may be inhibited. For example, the threshold value 182 may comprise a weight of a load that compresses a suspension system to a minimum height, or results in a mass that exceeds a torque output of the motors 132 to maintain a minimum acceleration.

One or more bumper switches 314 provide an indication of physical contact between a bumper or other member that is in mechanical contact with the bumper switch 314. The safety module 218 utilizes sensor data 152 obtained by the bumper switches 314 to modify the operation of the AMD 104. For example, if the bumper switch 314 associated with a front of the AMD 104 is triggered, the safety module 218 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 134 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 152 indicative of one or more of a presence or absence of an object 106, a distance to the object 106, or characteristics of the object 106. The optical sensor 320 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 134 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 218 and the autonomous navigation module 164 may utilize the sensor data 152 indicative of the distance to an object 106 in order to prevent a collision with that object 106.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 218. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 218 may utilize sensor data 152 obtained by the mast strain sensor 326. For example, if the strain applied to the mast exceeds a threshold amount, the safety module 218 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 218 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 280, one or more motors 132, and so forth. In the event the temperature exceeds a threshold value 182, the component associated with that device temperature sensor 330 may be shut down. For example, the threshold value 182 may be determined based on component specifications, such as a maximum permissible temperature of the batteries 280.

One or more interlock sensors 332 may provide data to the safety module 218 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyrometer 334 may provide information indicative of rotation of an object 106 affixed thereto. For example, a gyrometer 334 may generate sensor data 152 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyrometer 334 in the accelerometer 336 may comprise a prepackaged solid-state inertial measurement unit (IMU) 136 that provides multiple axis gyrometers 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 152 indicative of impinging light. For example, the photodetector 342 may provide data indicative of a color, intensity, duration, and so forth.

A camera 344 generates sensor data 152 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 152 comprising images being sent to the autonomous navigation module 164. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels 130 in contact with the floor may include an allegedly conductive pathway between the circuitry and the floor. By using two or more of these wheels 130, the circuitry may measure one or more of the electrical properties of the floor. Information obtained by the floor analysis sensor 356 may be used by one or more of the safety module 218, the autonomous navigation module 164, the task module 230, and so forth. For example, if the floor analysis sensor 356 determines that the floor is wet, the safety module 218 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 134 may include a radar 360. The radar 360 may be used to provide information as to a distance, lateral position, and so forth, to an object 106.

The sensors 134 may include a passive infrared (PIR) sensor 362. The PIR sensor 362 may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 164. One or more touch sensors may be utilized to determine contact with a user or other objects.

The AMD 104 may include one or more output devices 212. A motor 132 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 132 with an eccentric weight may be used to create a buzz or vibration to allow the AMD 104 to simulate the purr of a cat.

Figure 4:
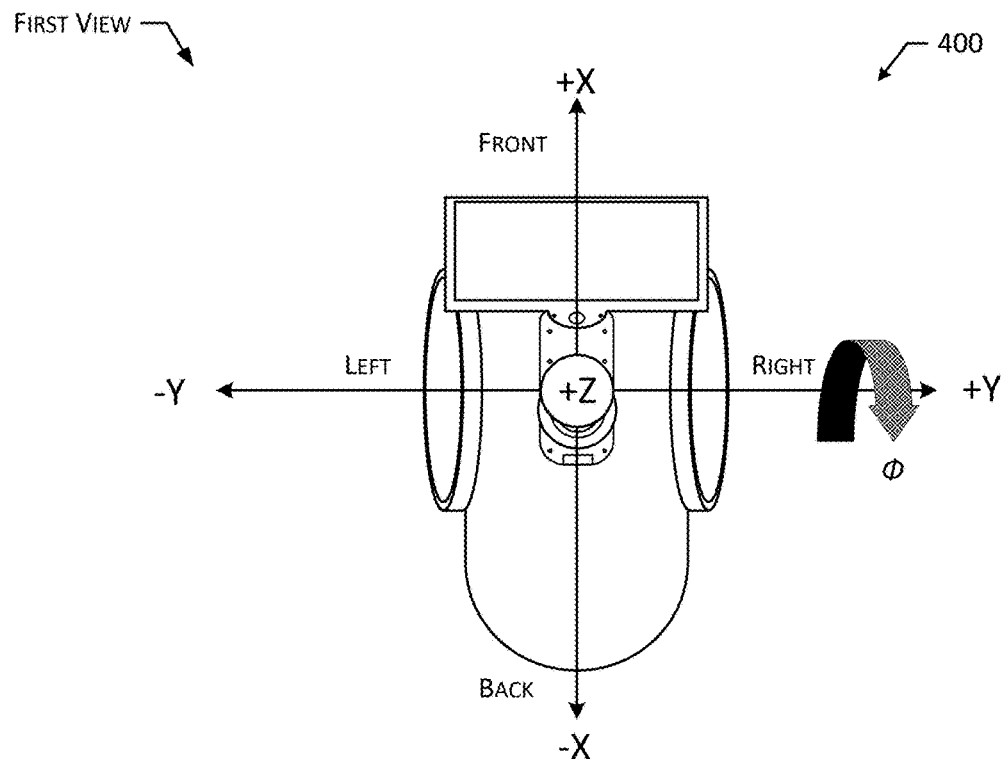
FIG. 4 is a diagram of the AMD, according to some implementations.
Figure 4:
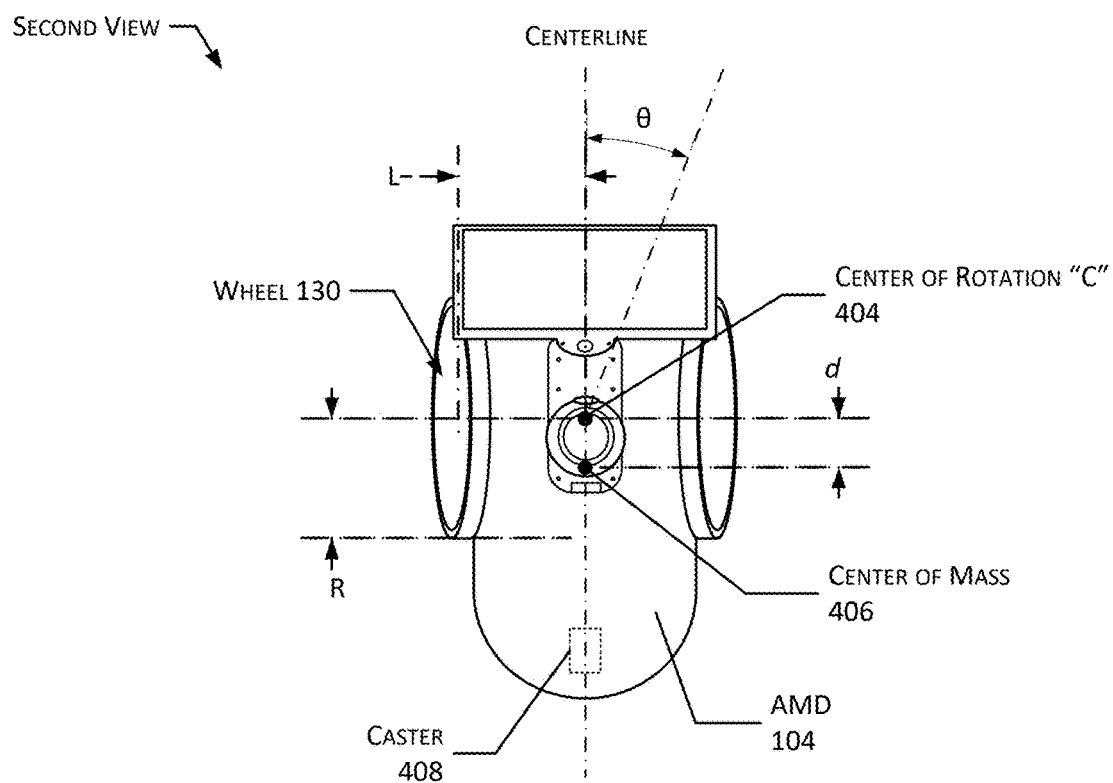

FIG. 4 is a diagram 400 of the AMD 104, according to some implementations. In the first view, the AMD 104 is shown with a coordinate system comprising three mutually orthogonal axes are shown with respect to the body of the AMD 104. In this illustration, an X axis extends between the front and back of the AMD 104 along a centerline of the AMD 104. Positive values of the X axis extend from the origin of the axis towards the front. Negative values of the X axis extend from the origin of the axis towards the back. A Y axis is perpendicular to the X axis. Positive values of the Y axis extend from the origin of the axis toward the right. Negative values of the Y axis extend from the origin of the axis toward the left. The X and Y axes may define a horizontal plane. A Z axis is perpendicular to the X and Y axes. The Z axis may be aligned vertically. Positive values of the Z axis extend from the origin upward. Negative values of the Z axis extend from the origin of the axis down.

Rotations may be described with respect to respective axes. For example, theta (θ) may describe rotation with respect to the Z axis. In another example phi (ϕ) may describe rotation with respect to the driven wheels 130.

In the second view, a centerline of the AMD 104 is depicted. In one implementation, each wheel 130 may be connected to a separate motor 132, allowing for differential operation and permitting the AMD 104 to move forward, backward, or rotate with respect to a center of rotation "C" 404. A caster wheel 408 may be present proximate to the back of the AMD 104. The center of rotation "C" 404 is offset with respect to a center of mass 406 of the AMD 104. The center of mass 406 may also be known as a center of gravity.

A length L is shown depicting a perpendicular distance, along the Y axis, between the centerline and each of the wheels 130. A distance d is shown depicting the distance, along the X axis, between the center of rotation "C" 404 and the center of mass 406. A radius R is shown depicting the radius of the wheel 130.

FIGS. 5-9 depict graphs of angular residual values and linear residual values and comparison to thresholds to determine if a collision has occurred in various scenarios, according to some implementations. In these graphs, a horizontal axis indicates time while a vertical axis indicates residual. Depicted are angular residuals, indicative of a variance between the measured motion values 176 and the predicted motion values 180 associated with angular movement. Also depicted are linear residuals, indicative of a variance between the measured motion values 176 and the predicted motion values 180 associated with linear movement. The units associated with the residual may be dimensional corresponding to their underlying values. For example, a linear residual may be specified as meters/second. In another example, an angular velocity may be specified as radians/second. In some implementations, the residual values 186 may be expressed as dimensionless values. For example, the residual values 186 may express a dimensionless ratio of the measured and predicted motion values.

For ease of illustration and not necessarily as a limitation, the threshold values 182 specify collision threshold range that is centered on 0 and symmetrical. For example, the threshold values 182 may specify a collision threshold comprising a range having a lower bound of −10 and an upper bound of +10. In some implementations asymmetrical, with respect to 0, ranges may be used. For example, the collision threshold may specify a range of −15 to +10.

Also for ease of illustration and not necessarily as a limitation, different collision thresholds may be specified for different types of motion such as linear or angular, different axes, or combinations thereof. For example, the threshold values 182 may specify a linear collision threshold range of −10 to +10 and specify an angular collision threshold range of −20 to +20. In another example, the threshold values 182 may specify a first linear collision threshold range along the X axis of −10 to +10 and a second linear collision threshold range along the Y axis of +15 to −15.

Figure 5:
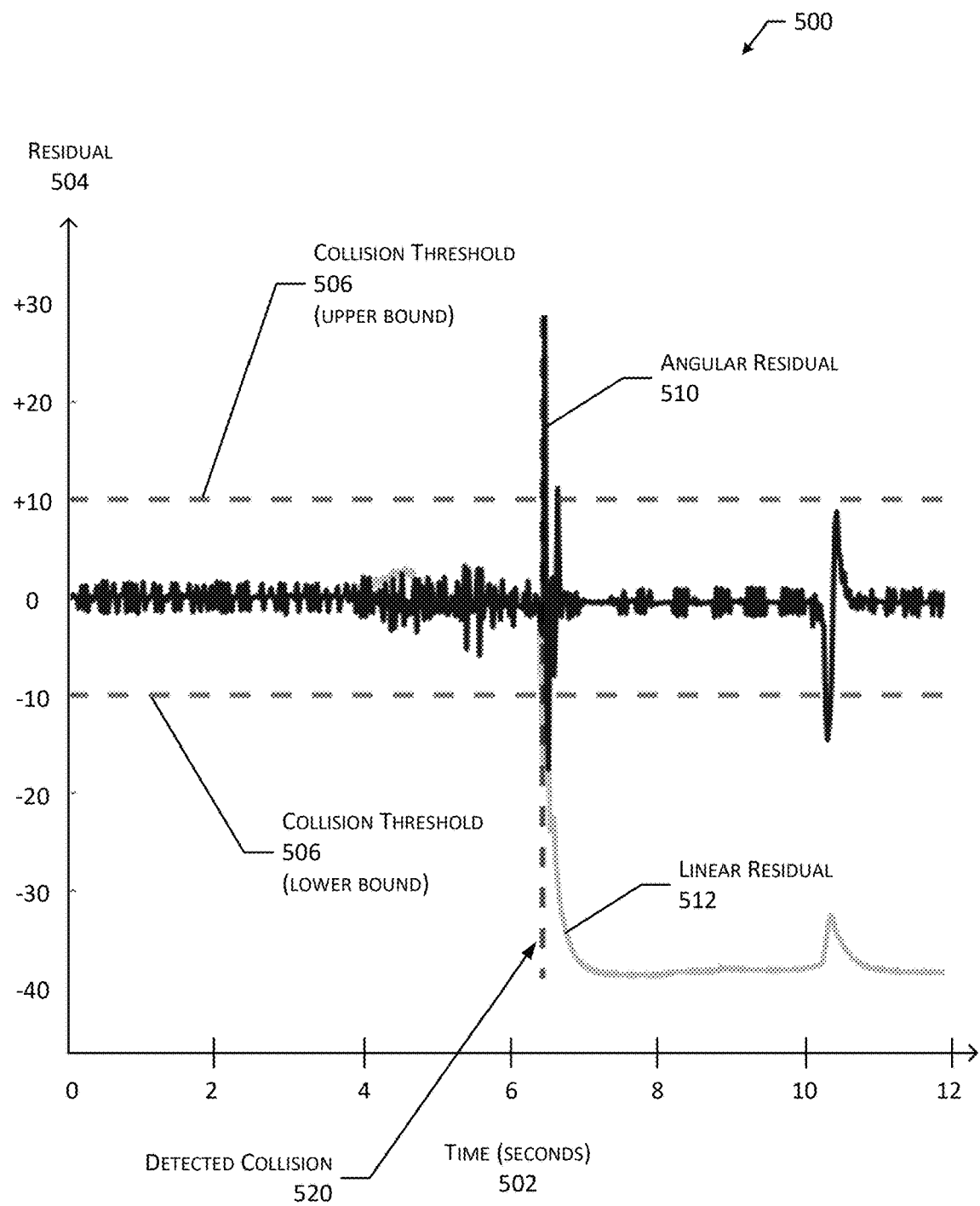
FIGS. 5-9 depict graphs of angular residual values and linear residual values and comparison to thresholds to determine if a collision has occurred, according to some implementations.

FIG. 5 depicts a graph 500 associated with the scenario of a forward collision in which a front portion of the AMD 104 has encountered an object 106.

A horizontal axis depicts time 502 increasing from left to right. A vertical axis depicts residual 504 values. The threshold values 182 may specify a collision threshold 506 comprising a single value, a range specified by a lower bound and an upper bound, and so forth. In the implementation shown, the collision threshold 506 specifies a range having an upper bound value of +10 and a lower bound value of −10.

The graph 500 depicts two curves representing angular residual 510 and linear residual 512. From time 0 until 6, the AMD 104 is moving forward along the floor without incident. Shortly after time=6, the angular residual 510 exceeds the upper bound of the collision threshold 506 and the linear residual 512 exceeds the lower bound of the collision threshold 506. A detected collision 520 is determined to have occurred at the time when both the angular residual 510 and the linear residual 512 exceeded the collision threshold 506. In some implementations a collision may be deemed to occur when either the angular residual 510 or the linear residual 512 exceeds their respective collision thresholds 506 or only when both residuals exceed their respective collision thresholds 506.

The approximate contact point 108 of the collision may be determined by analysis of the residual values 186. In the example shown in this graph 500, the negative sign associated with the linear residual that exceeds the lower bound of the collision threshold 506 indicates that the contact point 108 was on the front of the AMD 104. The positive angular residual 510 may be indicative of a contact on the front left, causing the AMD 104 to rotate slightly with respect to the Z axis.

Figure 6:
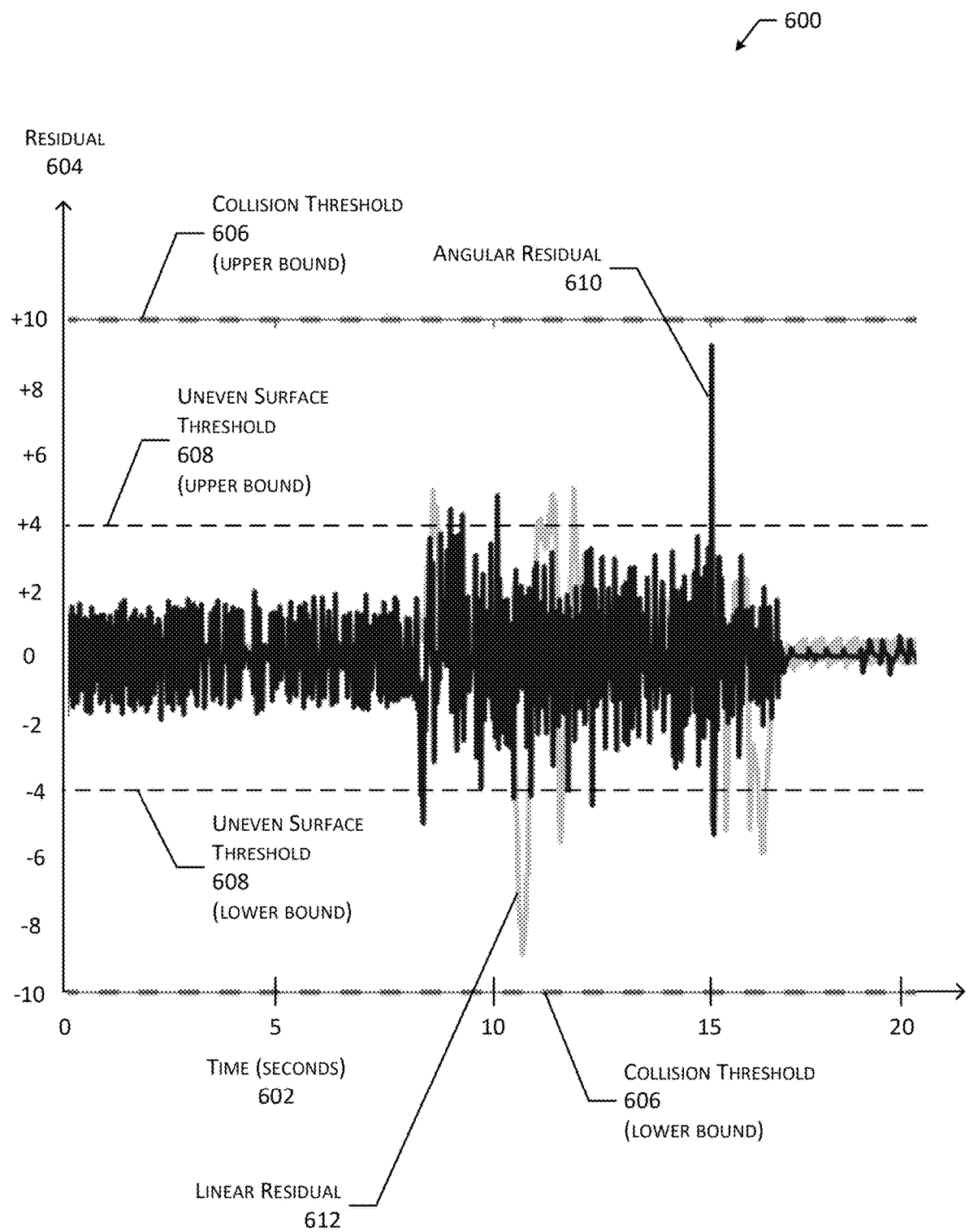

FIG. 6 depicts a graph 600 associated with the scenario of the AMD 104 traversing a flooring transition or other low object 106 comprised of an elevation change and does not result in a false collision detection.

When the AMD 104 encounters this relatively abrupt elevation change while moving it experiences a bump or transient acceleration. For example, the accelerometer 336 may indicate a transient vertical +Z movement corresponding to the bump. Other accelerations and rotations with respect to the axes of the AMD 104 may also be experienced due to a variety of factors. In collision detection systems relying only on information such as IMU data 154, a false collision may be detected by the AMD 104 encountering these elevation changes, such as a flooring transition. This may result in unwanted behavior, such as the AMD 104 stopping as a result of this incorrect detection of a false collision.

By using the collision detection module 172 described in this disclosure, such interactions with elevation changes in the flooring do not result in an unwanted false collision.

A horizontal axis depicts time 602 increasing from left to right. A vertical axis depicts residual 604 values. The threshold values 182 may specify a collision threshold 606 comprising a single value, a range specified by a lower bound and an upper bound, and so forth. In the implementation shown, the collision threshold 606 specifies a range having an upper bound value of +10 and a lower bound value of −10.

The graph 600 depicts two curves representing angular residual 610 and linear residual 612. From time 0 until approximately time 7, the AMD 104 is moving forward along the floor without incident. Shortly after time 7, the AMD 104 begins to traverse the floor transition. The angular residual 610 begins to increase from the baseline, but does not exceed the upper or lower bound of the collision threshold 606. Similarly, the linear residual 612 increases from the baseline, but does not exceed the upper or lower bound of the collision threshold 606. As a result, no collision is determined to have occurred. This allows the AMD 104 to continue on uninterrupted, moving to a destination location.

The threshold values 182 may specify other thresholds. Depicted in this figure is an uneven surface threshold 608. The uneven surface threshold 608 may be used to determine if the surface the AMD 104 is traversing is uneven. As shown in this graph, the angular residual 610 and the linear residual 612 values begin to exceed the uneven surface threshold 608 shortly after time 7. This continues until about time 16. In some implementations, the collision detection module 172 may provide collision data 188 that is indicative of floor conditions, such as the uneven floor, friction, and so forth. This data may then be used to designate portions of the physical space 102 as represented by the occupancy map 162 as being associated with the particular floor condition, such as an uneven floor, a floor with low friction, a floor with high friction, and so forth. For example, based on information indicative of the location of the AMD 104 with regard to the physical space 102 and the determination based on the collision detection module 172 of collision data 188 indicative of a floor condition of "uneven floor", the AMD 104 may specify that the location is associated with an uneven floor. This information may then be used by other modules. For example, the autonomous navigation module 164 may determine path plan data 170 that provides paths that, if possible, avoid particular floor conditions, such as the areas of uneven floor, or areas with low-friction (slippery) floors. In another example the mapping module 160 may use this information to decrease the reliability of map data based on sensor data 152 acquired by the AMD 104 while traversing an area associated with a particular floor condition, such as an uneven floor, due to possible vibration-related artifacts or poor odometry-based localization due to a slippery floor.

Figure 7:
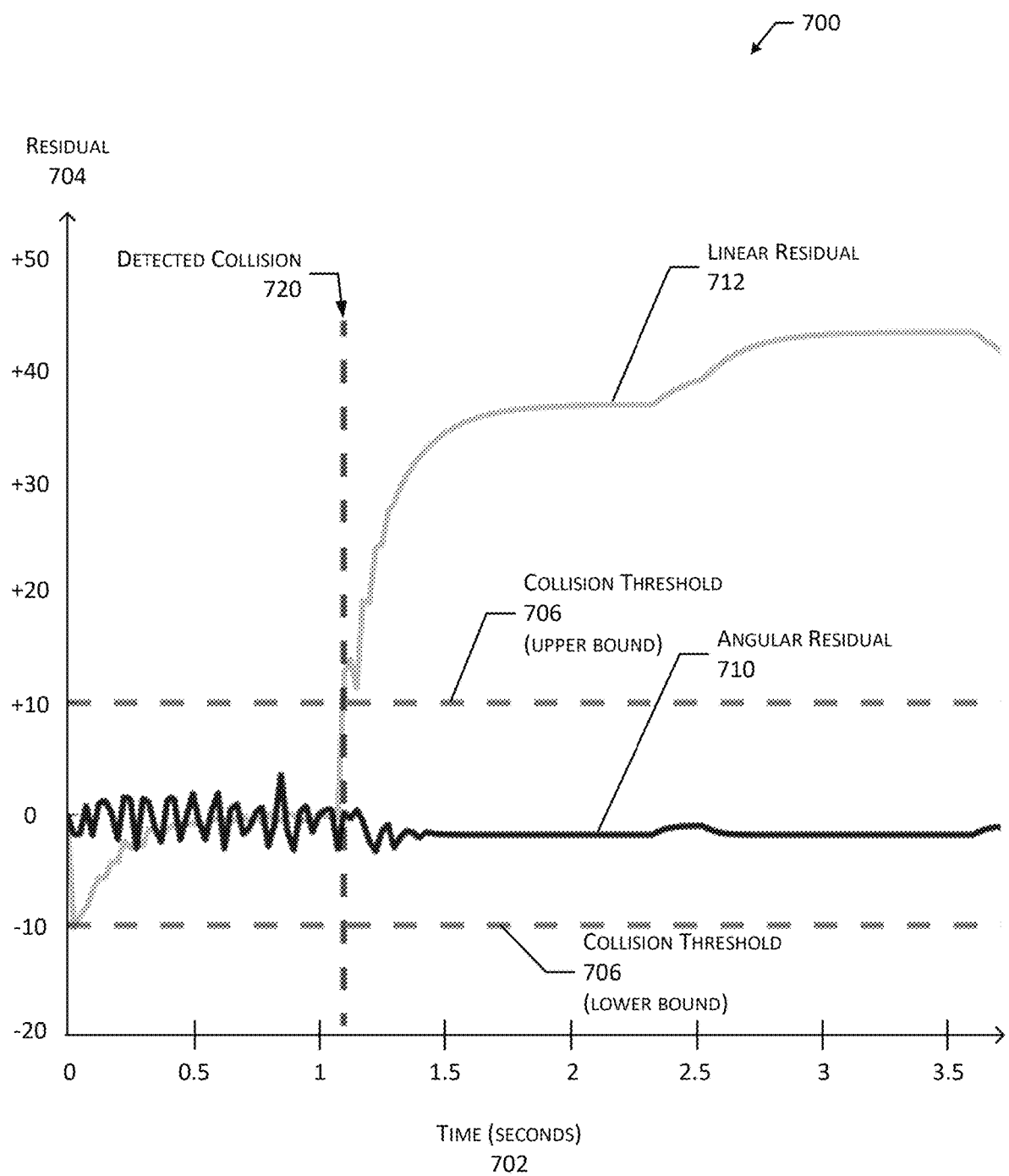

FIG. 7 depicts a graph 700 associated with the scenario of a rear collision in which a rear portion of the AMD 104 has encountered an object 106.

A horizontal axis depicts time 702 increasing from left to right. A vertical axis depicts residual 704 values. The threshold values 182 may specify a collision threshold 706 comprising a single value, a range specified by a lower bound and an upper bound, and so forth. In the implementation shown, the collision threshold 706 specifies a range having an upper bound value of +10 and a lower bound value of −10.

The graph 700 depicts two curves representing angular residual 710 and linear residual 712. From time 0 until shortly after 1, the AMD 104 is moving backward along the floor without incident. Shortly after time=1, the linear residual 712 exceeds the upper bound of the collision threshold 706. A detected collision 720 is determined to have occurred at the time when the linear residual 712 exceeded the collision threshold 706.

The approximate contact point 108 of the collision may be determined by analysis of the residual values 186. In the example shown in this graph 700, the positive sign associated with the linear residual 712 that exceeds the upper bound of the collision threshold 706 indicates that the contact point 108 was on the back of the AMD 104. The relatively minimal change in the angular residual 710, that did not exceed the collision threshold 706, may be indicative of a contact point 108 that is along the centerline.

Figure 8:
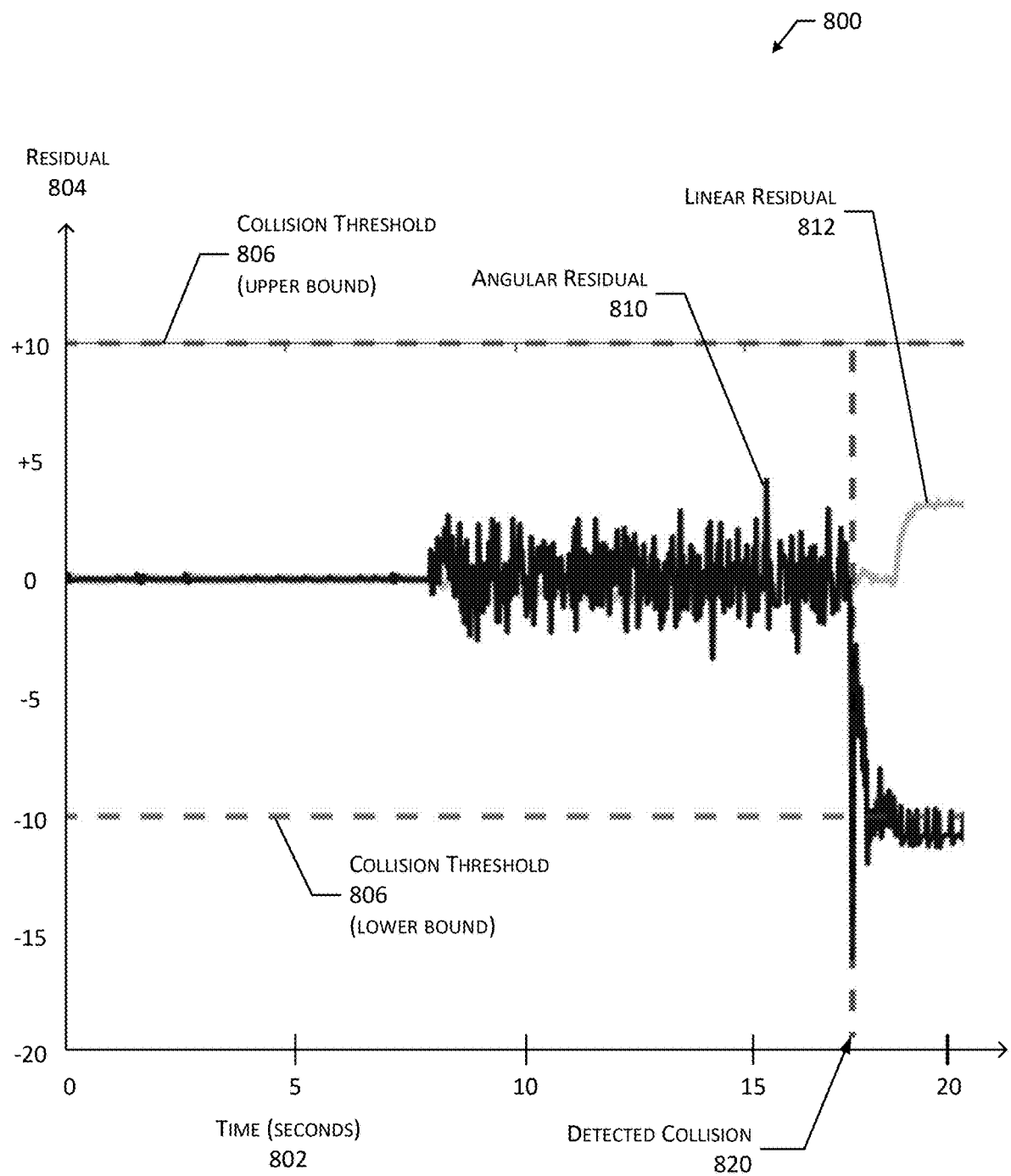

FIG. 8 depicts a graph 800 associated with the scenario of a left front portion of the AMD 104 colliding with an object 106 while turning.

A horizontal axis depicts time 802 increasing from left to right. A vertical axis depicts residual 804 values. The threshold values 182 may specify a collision threshold 806 comprising a single value, a range specified by a lower bound and an upper bound, and so forth. In the implementation shown, the collision threshold 806 specifies a range having an upper bound value of +10 and a lower bound value of −10.

The graph 800 depicts two curves representing angular residual 810 and linear residual 812. From time 0 until about time 8, the AMD 104 is motionless. After time 8, the AMD 104 begins to rotate counter-clockwise, relative to the Z axis. The rotation continues without incident until shortly after time 17. Shortly after time 17, the angular residual 810 exceeds the lower bound of the collision threshold 806. The linear residual 812 then begins to vary from a baseline value, but does not exceed the collision threshold 806. A detected collision 820 is determined to have occurred at the time when the angular residual 810 exceeded the collision threshold 806.

The approximate contact point 108 of the collision may be determined by analysis of the residual values 186. In the example shown in this graph 800, the negative sign associated with the angular residual 810 that exceeds the lower bound of the collision threshold 806 indicates that the contact point 108 was on the left front of the AMD 104.

Figure 9:
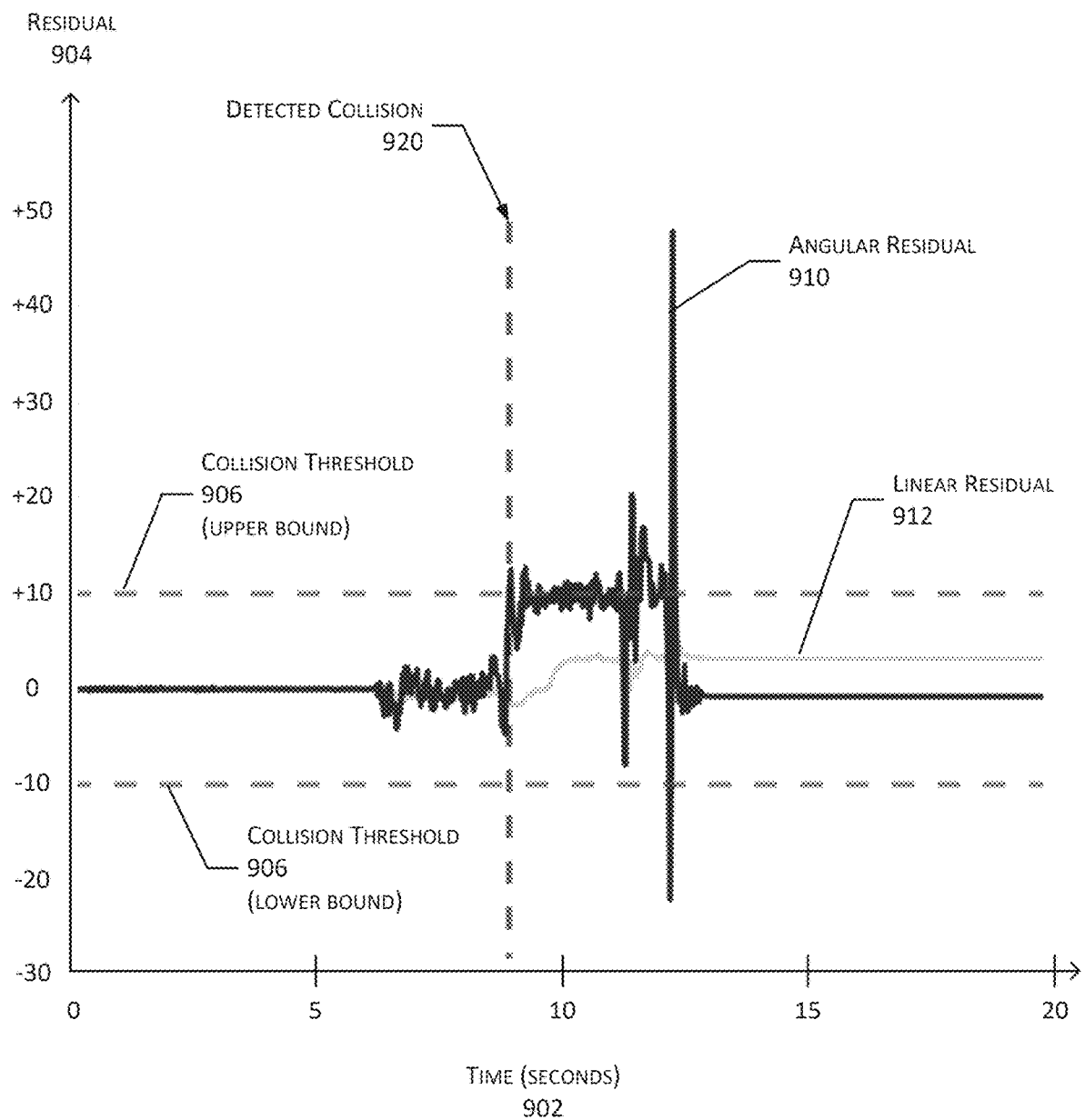

FIG. 9 depicts a graph 900 associated with the scenario of a right front portion of the AMD 104 colliding with an object 106 while turning.

A horizontal axis depicts time 902 increasing from left to right. A vertical axis depicts residual 904 values. The threshold values 182 may specify a collision threshold 906 comprising a single value, a range specified by a lower bound and an upper bound, and so forth. In the implementation shown, the collision threshold 906 specifies a range having an upper bound value of +10 and a lower bound value of −10.

The graph 900 depicts two curves representing angular residual 910 and linear residual 912. From time 0 until about time 7, the AMD 104 is motionless. After time 7, the AMD 104 begins to rotate clockwise, relative to the Z axis. The rotation continues without incident until shortly after time 9. At about time 9.5, the angular residual 910 exceeds the upper bound of the collision threshold 906. The linear residual 912 then begins to vary from a baseline value, but does not exceed the collision threshold 906. A detected collision 920 is determined to have occurred at the time when the angular residual 910 exceeded the collision threshold 906.

The approximate contact point 108 of the collision may be determined by analysis of the residual values 186. In the example shown in this graph 900, the positive sign associated with the angular residual 910 that exceeds the upper bound of the collision threshold 906 indicates that the contact point 108 was on the right front of the AMD 104.

Figure 10:
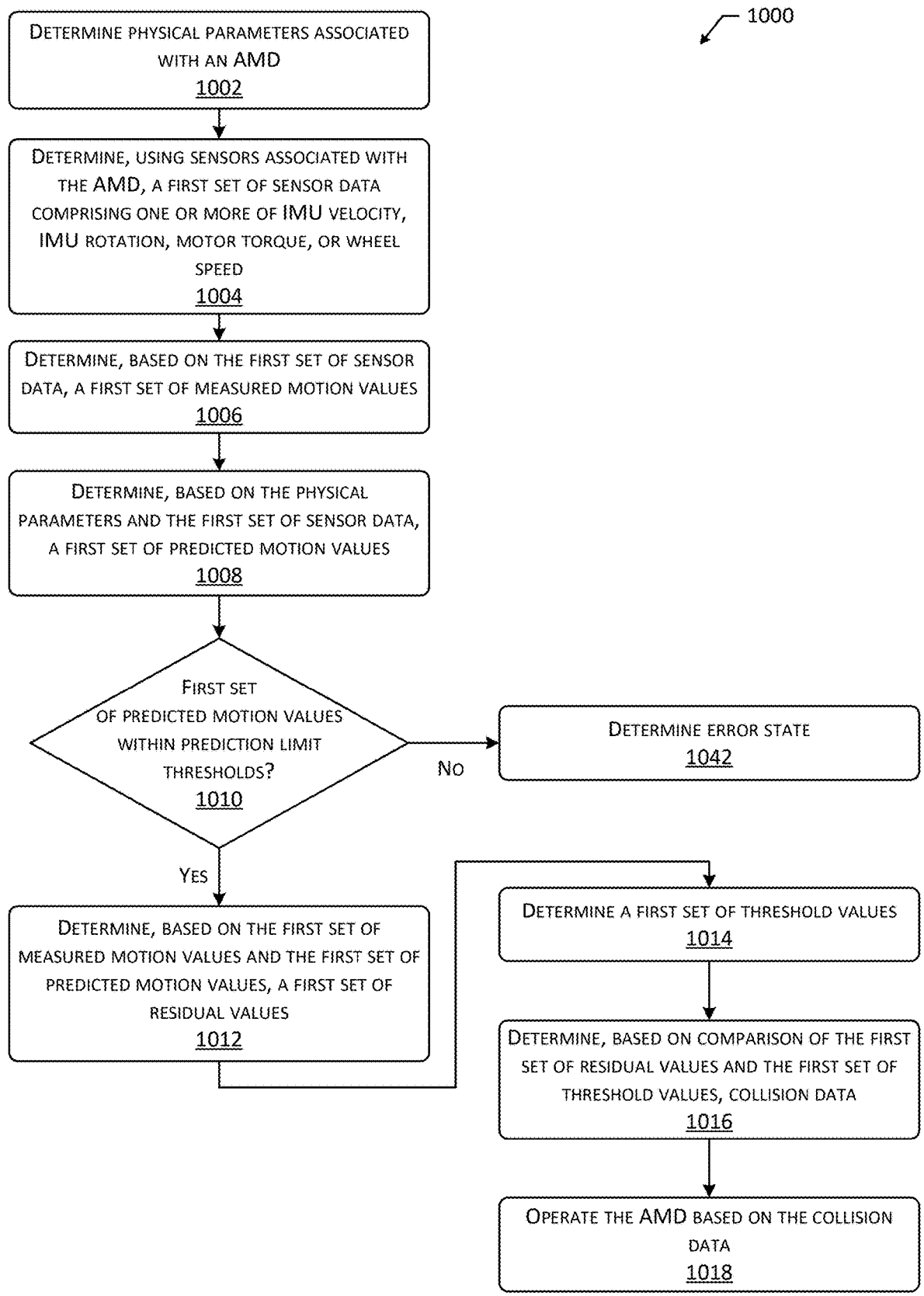
FIG. 10 is a flow diagram of a process to determine data indicative of a collision, according to some implementations.

FIG. 10 is a flow diagram 1000 of a process to determine data indicative of a collision, according to some implementations. The process may be performed by one of the AMD 104, the docking station 194, the servers 196, or other devices 198.

At 1002 the physical parameters 174 associated with the AMD 104 are determined. In one implementation the physical parameters 174 may be retrieved from storage in the memory 150. The physical parameters 174 may be calculated based on engineering models, physical testing, component data sheets, and so forth. The physical parameters 174 may include one or more of mass (or weight) of the AMD 104, location of a center of mass 406 of the AMD 104, radius R of a driven wheel 130, distance L between a centerline of the AMD and the first wheel 130, moment of inertia of each driven wheel 130, moment of inertia of the body of the AMD 104, and so forth.

At 1004, using sensors 134 associated with the ADM 104, a first set of sensor data 152 is determined. For example, the IMU 136 may be used to determine IMU data 154, the motor torque sensor 138 may determine motor torque data 156, the wheel speed sensor 140 may determine wheel speed data 158, and so forth. Continuing the example, the IMU data 154 may comprise IMU-determined linear velocity indicative of translation, angular velocity indicative of rotation, and so forth. The first set of sensor data 152 may comprise a time series of measurements or data acquired by the sensors 134 at particular times.

At 1006, based on the first set of sensor data 152, a first set of measured motion values 176 are determined. For example, the first set of measured motion values 176 may be indicative of a measured linear velocity, measured angular velocity, and so forth.

At 1008, based on the physical parameters 174 and the first set of sensor data 152, a first set of predicted motion values 180 are determined. For example, the physical parameters 174 and the first set of sensor data 152 or data based thereon, may be provided to the modelling module 178 that implements a physics-based model to determine the first set of predicted motion values 180. The first set of predicted motion values 180 may comprise a time series of values associated with, or corresponding to, the times indicated by the first set of sensor data 152.

In one implementation, the modeling module 178 may implement a dynamic model that is expressed using the following equations. The following equations assume the AMD 104 utilizes two equally sized driven wheels 130 and a trailing-caster layout, such as shown in FIG. 4. A predicted velocity of the AMD 104 may be calculated using the following equations and the motor torque data 156 as input.

$$\dot{v}_u = d\dot{\theta}^2 + \frac{1}{MR}(\tau_R + \tau_L) \quad \text{EQUATION 1}$$

$$\ddot{\theta} = \frac{L}{Md^2+J}\frac{\tau_R-\tau_L}{R} - \frac{Md}{Md^2+J}(v_u\dot{\theta}) \quad \text{EQUATION 2}$$

Where:
- $v_u$ is the AMD 104 linear velocity.
- $\dot{v}_u$ is the AMD 104 linear acceleration.
- $\tau_R$ is the motor torque applied to the right wheel 130.
- $\tau_L$ is the motor torque applied to the left wheel 130.
- $\dot{\theta}$ is the angular velocity of the AMD 104.
- $\ddot{\theta}$ is the angular acceleration of the AMD 104.
- J is moment of inertia with respect to the center of mass 406 of the AMD 104.
- θ is rotational angle between initial coordinate system ($x_I$, $y_I$) and AMD Coordinate System ($x_r$, $y_r$).
- 2L is a distance between the left and right wheels 130 along the orthogonal ($y_r$) axis of the AMD 104.
- R is the radius of the left and right wheels 130 of the AMD 104.
- M is the mass of the AMD without the driving wheels 130 and actuators.
- d is a distance between the left and right wheels 130 and the AMD's 104 center of mass 406 along the longitudinal axis.
- $\varphi_l, \varphi_r$ is the rotational angle of the left and right wheels 130.

During movement, the AMD 104 encounters several forms of friction. In particular, the friction between the wheels 130 and the floor. In some implementations, the friction may be set to a predetermined value. In other implementations the friction between the wheels 130 and the floor may be calculated. In one implementation, wheel speed data 158 and motor torque data 156 may be used to determine friction data indicative of friction between the wheels 130 and the floor.

The modelling module 178 may use a velocity observer algorithm to dynamically estimate the velocity of the AMD 104 based on the motor torque data 156, the wheel speed data 158, and the friction data. A dynamic estimation of the AMD 104 velocity $\dot{q}$ may be calculated and used to compute an unknown external force $T_{ext}$. If there is no external force being applied, the velocity observer algorithm exhibits stability, as shown in the following equation.

$$\underbrace{\begin{bmatrix} m & 0 \\ 0 & md^2+J \end{bmatrix}}_{M} \underbrace{\begin{bmatrix} \dot{v}_u \\ \ddot{\theta} \end{bmatrix}}_{\ddot{q}} + \underbrace{\begin{bmatrix} 0 & -md\dot{\theta} \\ md\dot{\theta} & 0 \end{bmatrix}}_{N(\dot{q})} \underbrace{\begin{bmatrix} v_u \\ \dot{\theta} \end{bmatrix}}_{\dot{q}} = \quad \text{EQUATION 3}$$

$$\underbrace{\frac{1}{R}\begin{bmatrix} 1 & 1 \\ L & -L \end{bmatrix}\begin{bmatrix} \tau_R \\ \tau_L \end{bmatrix}}_{T_m}$$

Equation 3 may be expressed as:

$$M\ddot{q}+N(\dot{q})\dot{q}=T_m \quad \text{EQUATION 4}$$

If an external force is present and acting on the AMD 104, the velocity observer algorithm is able to determine rapid changes to the external force, using the following equation:

$$\underbrace{\begin{bmatrix} m & 0 \\ 0 & md^2+J \end{bmatrix}}_{M} \underbrace{\begin{bmatrix} \dot{v}_u \\ \ddot{\theta} \end{bmatrix}}_{\ddot{q}} + \underbrace{\begin{bmatrix} 0 & -md\dot{\theta} \\ md\dot{\theta} & 0 \end{bmatrix}}_{N(\dot{q})} \underbrace{\begin{bmatrix} v_u \\ \dot{\theta} \end{bmatrix}}_{\dot{q}} - \quad \text{EQUATION 5}$$

$$\underbrace{\frac{1}{R}\begin{bmatrix} 1 & 1 \\ L & -L \end{bmatrix}\begin{bmatrix} \tau_R \\ \tau_L \end{bmatrix}}_{T_m} = \underbrace{\begin{bmatrix} 1 & 0 \\ 0 & \frac{md^2+J}{J} \end{bmatrix}\begin{bmatrix} F_{ext} \\ T_{ext} \end{bmatrix}}_{T_{ext}}$$

Equation 5 may be expressed as:

$$M\ddot{q}+N(\dot{q})\dot{q}-T_m=T_{ext} \quad \text{EQUATION 6}$$

With the velocity observer algorithm output "r" representing an estimated $T_{ext}$, observer dynamics may be defined using the following two equations:

$$\ddot{q}=M^{-1}(T_m-N(\dot{q})\dot{q}+r) \quad \text{EQUATION 7}$$

$$\dot{b}=K(\dot{q}-q) \quad \text{EQUATION 8}$$

In accordance with one or more implementations, a system takes torques ($T_m$), measured speeds ($\dot{q}$, $N(\dot{q})$), and the residuals ($T_{ext}$) to estimate the linear and angular acceleration ($\ddot{q}$), and then integrates them to be predicted speeds. The system uses the formula in Equation 7 and calculates the predicted linear and angular acceleration ($\ddot{q}$) using the torques ($T_m$) and measured speeds ($\dot{q}$, $N(\dot{q})$), and using a previously estimated set of residual values ($T_{ext}$, initially initialized to zero) from a prior set/loop of calculations for estimating residuals as r.

The system then uses a previous known velocity (e.g. at a time t−1 or associated with an immediately prior set of calculations for estimating residuals) and the predicted acceleration (from this set of calculations) to determine the predicted velocity, e.g. q-dot-current=q-dot-prior+q-dot-dot-hat(t-current−t-prior). The system uses the predicted velocity and the measured velocity to determine r-hat, representing an estimated set of linear and angular residual values, e.g. r-hat=v−v-hat. A hyper parameter K may be used to feedback to the state observer, e.g. r-hat=K(v−v-hat). (This estimated set of residual values will then be used in the next round/loop/set of calculations as noted above.)

In accordance with one or more implementations, this approach may operate to provide as observer output:

$$r(t) = K\left(\dot{q}(t) - \int_0^t M^{-1}(T_m - N(\dot{q})\dot{q} + r)ds - \dot{q}(0)\right) \quad \text{EQUATION 9}$$

In other implementations, other techniques may be used to determine the first set of predicted motion values 180.

In some implementations at 1010 one or more of the first set of predicted motion values 180 may be compared with one or more prediction limit thresholds. The prediction limit thresholds may be used to check for predicted motion values 180 that are deemed to be erroneous. In some circumstances, the modeling module 178 may return invalid or physically impossible outputs. For example, a stuck wheel 130 that has excessive torque applied may result in an estimated velocity of the AMD 104 that the AMD 104 would be unexpected to achieve. If at 1010 at least a portion of the first set of predicted motion values 180 are deemed to exceed the prediction limit thresholds, the process may proceed to 1042. In some implementations, 1010 may be omitted and the process may proceed directly to 1012.

At 1042 an error state may be determined. In some implementations, responsive to the error state, the AMD 104 may perform a mitigating action, such as stopping operation of the motors 132, using an output device 212 to present an error message to a user, and so forth.

Returning to 1010, if the first set of predicted motion values 180 are within the prediction limit thresholds, the process proceeds to 1012.

At 1012, based on the first set of measured motion values 176 and the first set of predicted motion values 180, a first set of residual values 186 are determined. For example, the residual values 186 may be calculated as a difference between the measured motion values 176 and the predicted motion values 180, or vice versa. The first set of residual values 186 comprise a time series of values associated with, or corresponding to, the times indicated by the first set of sensor data 152.

At 1014 a first set of threshold values 182 are determined. For example, the threshold values 182 may be retrieved from the memory 150. In some implementations, the threshold values 182 may be determined based on inputs, such as linear speed of the AMD 104, angular speed of the AMD 104, mass or weight of the AMD 104, whether the AMD 104 is carrying a load, mass or weight of the load, and so forth. For example, the threshold values 182 may be increased or decreased based on one or more of linear speed, rotational speed, weight of the AMD 104, weight of a load carried by the AMD 104, and so forth.

In another implementation the threshold values 182 may be determined based at least in part on other data, such as the occupancy map 162. For example, if the AMD 104 is determined to be at a location that is associated with an uneven surface as indicated by the occupancy map 162, the threshold values 182 may be increased.

At 1016, based on the comparison of the first set of residual values 186 and the first set of threshold values 182, collision data 188 is determined. For example, if the residual values 186 exceed the threshold values 182 as described above with regard to FIGS. 5 and 7-9, the collision data 188 may be indicative of a collision having occurred. In another example, if the residual values 186 do not exceed the threshold values 182, such as described with regard to FIG. 6, no collision is indicated. As described with regard to FIG. 6, the collision data 188 may be indicative of an uneven floor or other aspect of the physical space 102. The collision data 188 may also include information indicative of an approximate contact point 108 of the collision.

At 1018 the AMD 104 is operated based on the collision data 188. For example, if the collision data 188 indicates a collision, the AMD 104 may stop moving. In another example, if the collision data 188 indicates no collision, the AMD 104 may move along a path specified by the path plan data 170 without stopping.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
a first set of sensors; and
one or more processors to execute instructions to:
    determine physical parameters associated with the AMD;
    determine, using the first set of sensors, a first set of sensor data;
    determine, based on the first set of sensor data, a first set of motion values, wherein at least one value of the first set of motion values is associated with motion with respect to a first axis of the AMD and a sign associated with direction of the motion;
    determine, based on the physical parameters and the first set of sensor data, a second set of motion values;
    determine, based on the first set of motion values and the second set of motion values, a first set of values;
    determine a first set of threshold values;
    determine, based on a comparison of at least a portion of the first set of values and the first set of threshold values, first data; and
    operate the AMD based on the first data.

2. The AMD of claim 1, further comprising:
a body;
a first wheel mechanically coupled to the body; and
a second wheel mechanically coupled to the body;

wherein the physical parameters are indicative of one or more of:
mass of the AMD,
location of a center of mass of the AMD,
radius of the first wheel and the second wheel,
perpendicular distance between a centerline of the AMD and each of the first wheel and the second wheel,
moment of inertia of each of the first wheel and the second wheel, or
moment of inertia of the body of the AMD.

3. The AMD of claim 1, further comprising:
a first wheel mechanically coupled to a first motor;
a second wheel mechanically coupled to a second motor;
the first set of sensors comprising:
an inertial measurement unit (IMU),
a motor torque sensor, and
a wheel speed sensor; and
wherein to determine the first set of sensor data, the one or more processors to execute instructions to:
determine, using the IMU, IMU data indicative of acceleration data and rotation data associated with the AMD;
determine, using the motor torque sensor, motor torque data indicative of motor torque applied by one or more of the first motor or the second motor; and
determine, using the wheel speed sensor, wheel speed data indicative of wheel speed of one or more of the first wheel or the second wheel.

4. The AMD of claim 1, the one or more processors to execute instructions to:
determine one or more of a speed of the AMD or a weight of the AMD; and
determine one or more threshold values of the first set of threshold values based on the one or more of the speed or the weight.

5. The AMD of claim 1, the one or more processors to execute instructions to:
determine a first location of the AMD within a physical space;
wherein the first data is indicative of floor conditions at the first location; and
store data that associates the first data with the first location.

6. The AMD of claim 1, the one or more processors to execute instructions to:
determine, based on the first axis and the sign, a location with respect to the AMD of a collision.

7. The AMD of claim 1, wherein the first data is indicative of friction between a portion of the AMD and a surface in a physical space.

8. The AMD of claim 1, wherein:
the first set of motion values is indicative of a first linear motion and a first angular motion associated with the AMD; and
the first set of threshold values comprises:
a first threshold value associated with linear motion; and
a second threshold value associated with angular motion.

9. The AMD of claim 1, the one or more processors to execute instructions to:
determine each motion value of the second set of motion values is within a respective threshold range.

10. A computer-implemented method comprising:
determining physical parameters associated with an autonomous mobile device (AMD);
determining, using a first set of sensors, a first set of sensor data;
determining, based on the first set of sensor data, a first set of motion values indicative of a first linear motion and a first angular motion associated with the AMD;
determining, based on the physical parameters and the first set of sensor data, a second set of motion values;
determining, based on the first set of motion values and the second set of motion values, a first set of values;
determining a first set of threshold values comprising a first threshold value associated with linear motion and a second threshold value associated with angular motion;
determining, based on a comparison of at least a portion of the first set of values and the first set of threshold values, first data; and
operating the AMD based on the first data.

11. The computer-implemented method of claim 10, wherein the physical parameters are indicative of one or more of:
mass of the AMD,
location of a center of mass of the AMD,
radius of a driven wheel,
distance between a centerline of the AMD and a first wheel,
moment of inertia of each driven wheel, or
moment of inertia of a body of the AMD.

12. The computer-implemented method of claim 10, further comprising:
determining, using an inertial measurement unit, acceleration data and rotation data;
determining motor torque data indicative of motor torque applied by a motor to a driven wheel; and
determining wheel speed data indicative of wheel speed of a driven wheel.

13. The computer-implemented method of claim 10, further comprising:
determining one or more of a speed of the AMD or a weight of the AMD; and
determining one or more threshold values of the first set of threshold values based on the one or more of the speed or the weight.

14. The computer-implemented method of claim 10, further comprising:
determining a first location of the AMD within a physical space;
wherein the first data is indicative of floor conditions at the first location; and
storing data that associates the first data with the first location.

15. The computer-implemented method of claim 10, further comprising:
determining that at least one value of the first set of values is associated with:
motion with respect to a first axis of the AMD, and
a sign associated with direction of the motion; and
determining, based on the first axis and the sign, a location with respect to the AMD of a collision.

16. The computer-implemented method of claim 10, wherein the first data is indicative of friction between a portion of the AMD and a surface in a physical space.

17. The computer-implemented method of claim 10, further comprising:
determining each motion value of the second set of motion values is within a respective threshold range.

18. A device comprising:

a body;

a first motor mechanically coupled to the body;

a first wheel mechanically coupled to the first motor;

a second motor mechanically coupled to the body;

a second wheel mechanically coupled to the second motor;

a first set of sensors comprising:
- an inertial measurement unit (IMU),
- a motor torque sensor, and
- a wheel speed sensor; and one or more processors to execute instructions to:
- determine physical parameters associated with the device;
- determine, using the first set of sensors, a first set of sensor data, wherein the first set of sensor data comprises:
  - IMU data indicative of acceleration data and rotation data associated with the device, wherein the IMU data is determined using the IMU;
  - motor torque data indicative of motor torque applied by one or more of the first motor or the second motor, wherein the motor torque data is determined using the motor torque sensor; and
  - wheel speed data indicative of wheel speed of one or more of the first wheel or the second wheel, wherein the wheel speed data is determined using the wheel speed sensor;
- determine, based on the first set of sensor data, a first set of motion values;
- determine, based on the physical parameters and the first set of sensor data, a second set of motion values;
- determine, based on the first set of motion values and the second set of motion values, a first set of values;
- determine a first set of threshold values;
- determine, based on a comparison of at least a portion of the first set of values and the first set of threshold values, first data; and
- operate the device based on the first data.

19. The device of claim 18, the one or more processors to execute instructions to:
- determine one or more of a speed or a weight of the device; and
- determine one or more threshold values of the first set of threshold values based on the one or more of the speed or the weight.

20. The device of claim 17, wherein:

the first set of motion values is indicative of a first linear motion and a first angular motion associated with the device; and the first set of threshold values comprises: a first threshold value associated with linear motion; and a second threshold value associated with rotation.

\* \* \* \* \*